May 19, 1970    A. WALRAVEN    3,513,386
CONTACT-FREE SPEED MEASURING INSTRUMENTS
Filed Sept. 2, 1966    2 Sheets-Sheet 1

INVENTOR.
ANTHONIE WALRAVEN
BY
Frank R. Trifari
AGENT

United States Patent Office 3,513,386
Patented May 19, 1970

3,513,386
CONTACT-FREE SPEED MEASURING
INSTRUMENTS
Anthonie Walraven, Emmasingel, Eindhoven, Netherlands, assignor, by mesne assignments, to U.S. Philips Corporation, New York, N.Y., a corporation of Delaware
Filed Sept. 2, 1966, Ser. No. 576,880
Claims priority, application Netherlands, Sept. 10, 1965, 6511809
Int. Cl. G01p 3/49
U.S. Cl. 324—70
12 Claims

ABSTRACT OF THE DISCLOSURE

A tachometer having a magnet that defines an air gap and includes means for producing a steady magnetic field therein that exhibits a sinusoidal or pulsatory variation in intensity along the transverse direction of the air gap. An electrically conductive rotor is mounted within the air gap so that eddy currents are induced therein. First and second Hall elements are mounted in said air gap at points of maximum field intensity and zero field intensity, respectively. The signals generated in the Hall elements are supplied to a device that determines the ratio of the input signals. The ratio of the input signals is proportional to the rotor speed.

---

The present invention relates to tachometers and more particularly to a tachometer device for contact-free measurement of speeds, particularly angular speeds of rotating shafts. Devices of this type comprise a magnetic system with an air gap in which at least part of the magnetic system consists of, or is provided with, means for producing a magnetic field in the air gap, and in which the air gap accommodates a movable element consisting at least partly of electrically conductive material, the speed of which has to be determined.

Tachometers are known in which a movable measuring disc of non-magnetic, electrically conductive material is arranged in an air gap between two parts of a magnetic system. By means of A.C. driven energizing coils, eddy currents are produced in the measuring disc in accordance with the Ferrari principle. A magnetic field produced by said eddy currents induces a current of voltage in magnetic pick-ups arranged in the air gap. The ampiltude of said current or voltage is a measure of the angular velocity when the disc rotates.

A further known arrangement is the cylindrical structure of the former device. In this case a known induction motor is used in which the coil windings of the stator are fed by alternating current. A rotation of the rotor produces in the air gap an alternating field which induces an alternating current or voltage in a magnetic pick-up. The amplitude of said alternating current or voltage is a measure of the angular velocity of the rotor.

Such induction systems have the disadvantage that the relationship between the angular velocity and the current induced in the magnetic pick-ups is not linear over a large measuring range. A further disadvantage resides in the fact that variations of the magnetic field in the air gap due to supply voltage fluctuations or other external influences affect the measuring results. The invention has for an object to provide a magnetic field and an arrangement of magnetic probes in the air gap that produces a materially improved linearity of the measuring voltage as a function of the speed, while, moreover, supply voltage fluctuations and disturbances are eliminated for the major part.

The invention comprises means for producing a steady magnetic field in the air gap constructed so that the magnetic induction between two facing walls of the air gap may have an alternating, for example, pulsatory or sinusoidal variation in the transverse direction of the air gap. In or near the air gap at least two magnetic probes are arranged so that a first probe is arranged at a maximum point in the alternating magnetic field at a standstill of the movable element and a second probe is arranged at the place of a zero passage of the alternating magnetic field at a standstill of the movable element. The invention also includes a device for determining the ratio between the signals produced in the magnetic probes during movement of the element, this ratio being a measure of the velocity. The field variation referred to above is not a time variation, but rather a spacial variation.

The invention is based on calculations of the field in the air gap produced during movement of the measuring element consisting at least partly of electrically conductive material.

Such a calculation shows that by providing a magnetic portion on part of the magnetic system that produces an alternating, for example, pulsatory or sinusoidal, magnetic field in the air gap, magnetic inductions are produced upon movement of the movable element at the places in the system where a maximum magnetic induction prevails at a standstill of the movable element, and at the places where the magnetic induction is zero at a standstill of the movable element, the ratio between said magnetic inductions being a measure of the velocity of the moving element.

The devices according to the invention may have various flat and cylindrical constructions.

In these constructions the movable element, at least part of which, preferably the part facing the air gap, consists of electrically conductive material, may be completely of iron or of a magnetic material with a surface layer of electrically conductive material or it may be made completely from electrically conductive material, for example, in the cylindrical construction, it may be formed by a thin-walled copper cylinder.

A calculation of an arrangement according to the invention in which the field in the air gap varies sinusoidally and the movable element is made completely of a material of satisfactory electric conductivity, for example, copper, shows that at the place where a maximum magnetic induction $B_0$ prevails at a standstill of the movable element an induction $B_1$ is produced, which is given by the formula:

$$B_1 = B_0 \frac{1}{1+w^2}$$

wherein $w$ is the standardised velocity:

$$w = \frac{\omega}{\omega_{kr}}$$

wherein $\omega$ is the real velocity and $\omega_{kr}$ is the critical velocity of the device considered as an eddy-current brake. It has furthermore been found that at the place in the air gap where no magnetic induction prevails at a standstill of the movable element a magnetic induction $B_2$ is produced upon movement of the movable element, which is given by the formula:

$$B_2 = B_0 \frac{w}{1+w^2}$$

According to the invention magnetic probes, for example, Hall elements or transductor probes, are provided at the said two places in the air gap, the respective outputs of which provide electric signals which are proportional to said induction values $B_1$ and $B_2$. The ratio between the two signals provides the desired measuring result, that is to say, $B_2/B_1 = w$. In this way a linear relationship is achieved. Moreover, the factor $B_0$ is eliminated from the formula as a measure for the induction of the field in the air gap at a standstill of the movable element. The ratio between the two inductions $B_1$ and $B_2$ may be measured in known devices for measuring the ratio between electric signals or by a different method in which the same control current is used for the magnetic probes and the value of this control current is determined by a measuring voltage produced in the probe.

The invention will now be described more fully with reference to the accompanying drawing, in which.

Figure 1:
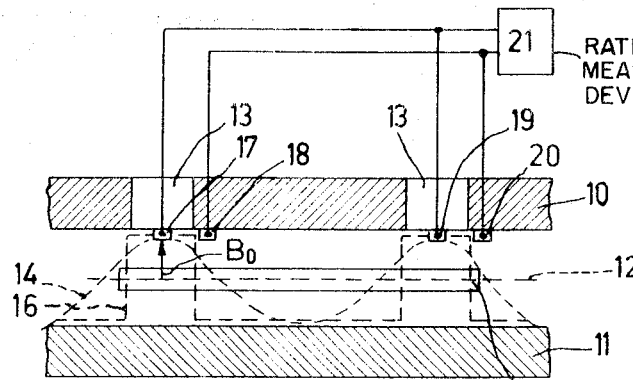
FIG. 1 illustrates a first embodiment of a device according to the invention.

In the device shown in FIG. 1, the parts 10 and 11 represent a magnetic system, for example, of ferromagnetic material, having an air gap 12. Herein a movable measuring element 15 is arranged. The part 10 of the magnetic system is provided with means 13 for producing a sinusoidal magnetic field 14 or a pulsatory magnetic field 16 in the air gap 12. The field producing means 13 may be formed by a known magnet arrangement or a coil configuration as shown, for example, in U.S. Pat. 2,889,475. In practice, the part 11 of the embodiment shown also may be provided with such means 13 so that the field variation is further emphasized.

In the example of FIG. 1, the movable element may consist completely of electrically conductive material. In practice, the part 11 of the magnetic system may be combined in one unit with the measuring element 15. The part 11 may then be omitted and the movable element 15 then consists partly of a magnetic material and of a part of electrically conductive material facing the part 10 of the magnetic system. It is also possible for the element 15 to consist completely of an iron material which is conductive both magnetically and electrically.

According to the invention magnetic probes, for example, Hall elements or transductor probes 17, 18, 19, 20, are provided at the places where maxima and zero passages, respectively, of the magnetic field prevail at a standstill of the element 15. At the places where the probes are mounted, the aforesaid components $B_1$ and $B_2$ of the magnetic induction are produced upon movement of the element 15.

Figures 2, 3:
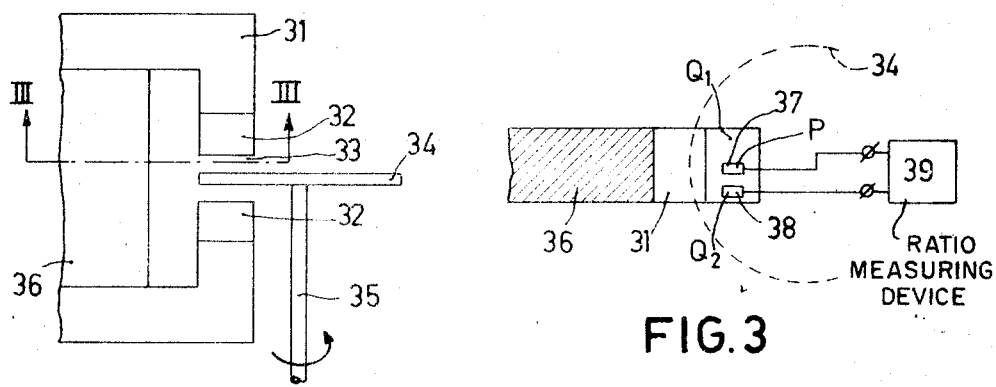
FIG. 2 is a second example of a device according to the invention.
FIG. 3 is a sectional view of the device of FIG. 2.

Said inductions are converted in the probes into electric signals, which are supplied in the form of a voltage or a current to the measuring device 21, in which the velocity of the element 15 is determined from the ratio between $B_2$ nd $B_1$ and indicated. In the arrangement shown in FIG. 2, reference numeral 31 designates a magnetic system having pole pieces 32 in the air gap 33. This magnetic system may be made of ferromagnetic material or it may be formed by a permanent magnet. The disc 34 is the measuring element, which is adapted in this embodiment to rotate about a shaft 35. The disc is made of non-magnetic electrically conductive material, for example, alumininum.

The stationary magnetic field in the air gap 33 is furnished by an arrangement of, for example, one or more permanent magnets 36 or a known coil arrangement (not shown) which is fed from a D.C. supply or it is formed by the magnet itself if the system 31 is a permanent magnet. According to the invention the magnetic field in the air gap 33 must have an alternating, for example, sinusoidal or pulsatory variation, which means (see FIG. 3) that a place P in the air gap where the magnetic induction has a maximum value $B_0$ must alternate with a place $Q_1$ (or $Q_2$) where no magnetic induction prevails, at least at a standstill of the disc 34. This may be achieved in known manner by a suitable choice of the shape of the pole pieces 32, by a special disposition of magnet elements in the magnetic system, or by an appropriate coil configuration.

According to the invention the magnetic probes 37 and 38, for example, Hall elements or transductor probes, are arranged at the places P and $Q_1$ or $Q_2$. At the outputs of the probes 37 and 38 the desired signals appear for the said field components $B_1$ and $B_2$. The ratio between $B_2$ and $B_1=w$ of these signals, that is to say the velocity of the disc 34, is determined in known manner in a device 39.

Figure 4:
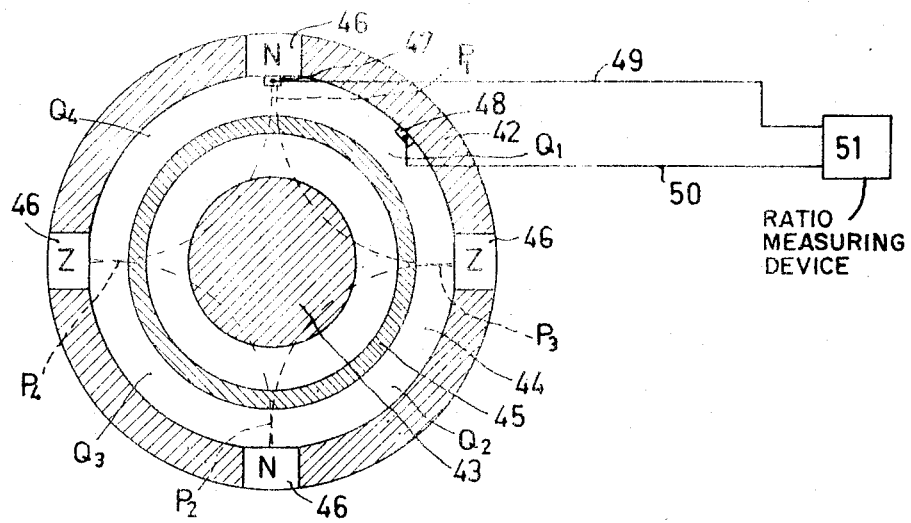
FIG. 4 shows a second embodiment of the invention.

FIG. 4 shows a further embodiment of a device according to the invention, in which the construction of the device shown in FIG. 1 is completely cylindrical. Reference numeral 42 is a hollow cylinder and 43 a solid cylinder arranged concentrically in the former, both cylinders consisting, for example, of magnetic material. These cylinders 42 and 43 correspond to the parts 10 and 11, respectively, of the device of FIG. 1. The cylinders 42 and 43 enclose an air gap 44, in which is arranged a rotatable cylinder 45 concentric to the two cylinders 42 and 43. Cylinder 45 is made of non-magnetic electrically conductive material and corresponds to the measuring element 15 of FIG. 1. In a manner similar to the device of FIG. 1, the rotatable cylinder 45 may be combined with the cylinder 43.

The magnetic field is produced in the air gap 44 by permanent magnets 46 having alternating north and south poles arranged in the outer cylinder 42, or by a D.C. driven coil (not shown). In this configuration the desired field variation is thus directly obtained in a simple manner, since at the place $P_1$ and $P_2$ a maximum of magnetic field induction ($B_0$) is produced at a standstill of the cylinder 45 and at the place $P_3$ or $P_4$ there is produced a minimum induction ($-B_0$). At the places $Q_1$, $Q_2$, $Q_3$ and $Q_4$ the magnetic induction is zero at a standstill of the cylinder 45. By providing more magnets or coils along the circumference of the cylinder 42, further corresponding points P and Q may be obtained. It should be noted that this configuration corresponds, if coils are used, to the conventional induction-motor system, the difference being, however, that the coils of the stator are now fed by direct current.

According to the invention the magnetic probes 47 and 48 are furthermore disposed, for example, at the places $P_1$ and $Q_1$, the respective outputs 49 and 50 of said probes being connected to a device 51, in which the measuring result becomes available after division of the two magnetic components $B_1$ and $B_2$.

Figure 5:
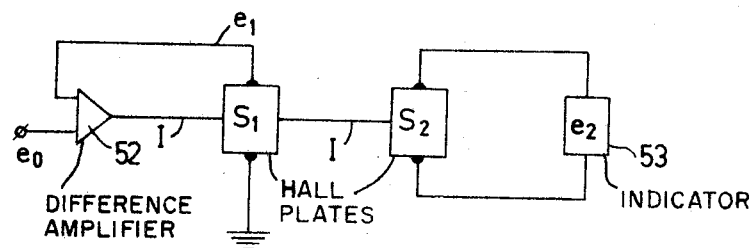
FIG. 5 shows a block diagram of an arrangement for determining the ratio between the magnetic inductions.

FIG. 5 shows a diagram which illustrates how the ratio between the electric signals is obtained, for example, from two Hall elements, which ratio indicates the velocity $\omega$.

The Hall elements $S_1$ and $S_2$ are supplied with a control current I from a D.C. difference amplifier 52. The D.C. difference amplifier 52, having a current amplification factor $g$, is connected in series with the probes $S_1$ and $S_2$. This difference amplifier receives at one input a voltage $e_0$ from a reference supply source and at the other input a voltage $e_1$ from the probe $S_1$.

The voltages $e_1$ and $e_2$ produced in the probes $S_1$ and $S_2$ depend upon the respective field components $B_1$ and $B_2$: $e_1=K_1.I.B_1$ and $e_2=K_2.I.B_2$ wherein $K_1$ and $K_2$ are constants. The output current of the difference amplifier 52 is: $I=g'(e_0-e_1)$, wherein $g'$ is the transconductance of the amplifier 52. Also, the formula $e_1=K_1.I.B_1$ determines the current I.

$$I=\frac{g'e_0}{1+g'\cdot K_1 \cdot B_1}=\frac{e_0}{K_1 B_1}$$

it being assumed that $g'K_1B_1 \gg 1$. Moreover, $e_2=K_2.I.B_2$ and hence in the above formula:

$$e_2=\frac{K_2 B_2}{K_1 B_1}e_0=\frac{K_2}{K_1}\cdot\frac{e_0}{\omega_{kr}}\cdot\omega$$

so that $e_2$ is a direct measure of the velocity $\omega$.

This voltage can be read from an instrument 53 having a dial calibrated, for example, in the angular velocity $\omega$.

Figure 6:
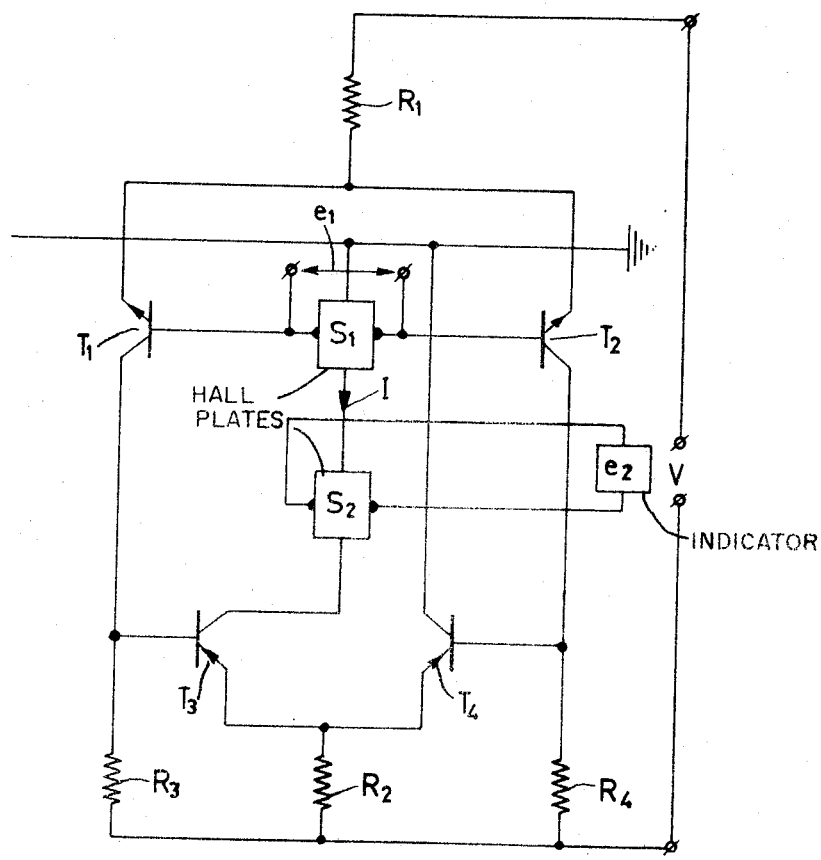
FIG. 6 shows a further embodiment of the arrangement of FIG. 5.

FIG. 6 shows a diagram of a further embodiment of an arrangement based on the principle of FIG. 5 for two probes $S_1$ and $S_2$.

Here V designates a supply voltage source for the amplifier, which determines at the same time the reference voltage $e_0$. $T_1$, $T_2$, $T_3$ and $T_4$ are amplifying elements, for example, transistors of the p-n-p and n-p-n type.

$R_1$, $R_2$, $R_3$ and $R_4$ are adjusting resistors for said transistors. In this arrangement, as described with reference to FIG. 5, the control current I is determined by the probes by the difference between the voltage $e_1$ from the probe $S_1$ and part of the supply voltage V as a reference voltage. In a similar manner the voltage $e_2$ is a direct measure of the angular velocity.

What is claimed is:

1. A tachometer device comprising, a magnetic system having opposed walls arranged to define an air gap and including means for producing a steady magnetic field in the air gap that exhibits a periodic variation in intensity along the transverse direction of the air gap, a movable element composed at least partly of electrically conductive material arranged in the air gap, said element being movable primarily in a direction parallel to the transverse direction of the air gap, a first magnetic probe for producing a signal proportional to a component of magnetic field strength normal to the direction of travel of the movable element and arranged at a point of maximum intensity of the magnetic field at standstill of the movable element, a second magnetic probe for producing a signal proportional to a component of magnetic field strength normal to the direction of travel of the movable element and arranged at a point of zero intensity of the magnetic field at standstill of the movable element, a device for determining the ratio between a pair of input signals applied thereto, and means for coupling the signals produced in the magnetic probes upon movement of the movable element to the input of said ratio determining device, the ratio being a measure of the velocity of the movable element.

2. A device as claimed in claim 1 wherein the device for determining the ratio between the signals produced in the magnetic probes comprises, a difference amplifier, an indicator, a reference voltage source connected to one input of the difference amplifier, means connecting the output of a first magnetic probe to a second input of the difference amplifier, the value of the output current of the difference amplifier being determined by the difference between the reference voltage and the voltage of the first magnetic probe, means for supplying said output current as a control current to the magnetic probes, and means for applying the output voltage of the second magnetic probe to the indicator.

3. A device as claimed in claim 2, wherein the magnetic probes comprise Hall elements.

4. A device as claimed in claim 1 wherein said magnetic field producing means is arranged to produce a sinusoidal variation in the field intensity along said transverse direction of the air gap.

5. A tachometer comprising a magnet for producing a steady magnetic field adjacent a surface thereof that exhibits a periodic variation in intensity along a direction parallel to said surface, an electrically conductive rotor movable through said magnetic field primarily in a direction parallel to said surface to induce an electric current in the rotor, first and second magnetic probes for producing signals proportional to a component of magnetic field strength normal to the direction of travel of the rotor and mounted within said magnetic field at points of maximum intensity and zero intensity at standstill of the rotor, respectively, and output means including said first and second probes for producing a control signal that is proportional to the ratio of the signals generated by said first and second probes during rotation of the rotor.

6. A tachometer as claimed in claim 5 wherein said rotor comprises a body of magnetic material having a layer of electrically conductive material on the surface thereof facing the magnet surface.

7. A tachometer as claimed in claim 5 wherein each of said magnetic probes comprises a Hall effect element.

8. A tachometer as claimed in claim 5 wherein each of said magnetic probes comprises a Hall effect element, and said output means further comprises, a reference voltage source, means connecting the input electrodes of said Hall effect elements in series circuit, means responsive to the voltage generated in the first Hall effect element and to the reference voltage for supplying a control current to the input electrodes of said Hall effect elements, and indicator means coupled to the output electrodes of the second Hall effect element for providing a signal that is proportional to the ratio of the voltages generated in said Hall effect elements.

9. A tachometer as claimed in claim 5 wherein said magnet further comprises a magnetic member having a surface opposite the first surface to define therewith an air gap, said rotor being rotatably mounted within the air gap, the magnet being arranged to produce a sinusoidal variation in the field intensity along the transverse direction of the air gap.

10. A tachometer as claimed in claim 5 wherein said magnet further comprises a magnetic member having a surface opposite the first surface to define therewith an air gap, said rotor being rotatably mounted within the air gap, the magnet being arranged to produce a pulsatory variation in the field intensity along the transverse direction of the air gap.

11. A tachometer as claimed in claim 5 wherein said magnet comprises a hollow cylinder and said rotor comprises a hollow cylinder concentrically mounted within said magnet cylinder, said tachometer further comprising a cylinder of magnetic material concentrically mounted within the rotor cylinder.

12. A tachometer as claimed in claim 11 wherein said magnet cylinder includes a plurality of alternating north and south poles about its periphery.

References Cited

UNITED STATES PATENTS

| 3,018,395 | 1/1962 | Carlstein | 324—70 |
|---|---|---|---|
| 3,229,202 | 1/1966 | Wenk | 324—70 |
| 3,281,682 | 10/1966 | Bauerlein | 324—70 |

FOREIGN PATENTS

| 618,003 | 2/1949 | Great Britain. |
|---|---|---|

RUDOLPH V. ROLINEC, Primary Examiner

M. J. LYNCH, Assistant Examiner

U.S. Cl. X.R.

324—45

PO-1050
(5/69)

UNITED STATES PATENT OFFICE
CERTIFICATE OF CORRECTION

Patent No. 3,513,386      Dated May 19, 1970

Inventor(s) ANTHONIE WALRAVEN

It is certified that error appears in the above-identified patent and that said Letters Patent are hereby corrected as shown below:

Claim 2, column 5, line 47, cancel "a" (1st occurrence) and insert -- the --;

Claim 8, column 6, lines 26 & 27, cancel "ratio of the voltages generated in said Hall effect elements" and insert -- rotor speed --;

Claim 10, column 6, line 39, cancel "pulsatory" and insert -- generally rectangular --;

Signed and sealed this 2nd day February 1971.

(SEAL)
Attest:

Edward M. Fletcher, Jr.
Attesting Officer

WILLIAM E. SCHUYLER, JR.
Commissioner of Patents